(12) United States Patent
Malhotra et al.

(10) Patent No.: US 6,303,217 B1
(45) Date of Patent: Oct. 16, 2001

(54) LONGITUDINAL RECORDING MEDIUM WITH A DUAL UNDERLAYER

(75) Inventors: Sudhir S. Malhotra, Fremont; Brij Bihari Lal, Milpitas; Michael A. Russak, Pleasanton, all of CA (US)

(73) Assignee: HMT Technology, Corporation, Fremont, CA (US)

( * ) Notice: Subject to any disclaimer, the term of this patent is extended or adjusted under 35 U.S.C. 154(b) by 0 days.

(21) Appl. No.: 09/165,434

(22) Filed: Oct. 2, 1998

(51) Int. Cl.$^7$ .................................................. G11B 5/66
(52) U.S. Cl. .................. 428/332; 428/336; 428/694 TS; 428/900
(58) Field of Search ................ 428/694 TS, 336, 428/900, 332

(56) References Cited

U.S. PATENT DOCUMENTS

| | | | |
|---|---|---|---|
| 4,833,020 | * 5/1989 | Shiroishi | 428/336 |
| 5,122,423 | 6/1992 | Hase et al. | 428/694 TS |
| 5,316,844 | 5/1994 | Suzuki et al. | 428/323 |
| 5,456,978 | 10/1995 | Lal et al. | 428/332 |
| 5,569,533 | 10/1996 | Lal et al. | 428/332 |

* cited by examiner

*Primary Examiner*—Leszek Kiliman
(74) *Attorney, Agent, or Firm*—Judy M. Mohr; Perkins Coie LLP

(57) ABSTRACT

A magnetic recording medium having a dual underlayer structure is described. The underlayer structure is composed of a first underlayer of chromium and a second underlayer of a chromium alloy.

21 Claims, 6 Drawing Sheets

LONGITUDINAL RECORDING MEDIUM WITH A DUAL UNDERLAYER

FIELD OF THE INVENTION

The present invention relates to a magnetic recording medium having a first underlayer and a second underlayer. The medium is of the type formed on a rigid disc for use in magnetic recording devices, such as a computer disc drive.

BACKGROUND OF THE INVENTION

Thin-film magnetic discs or media are widely used as data storage media for digital computers. The discs are typically formed by successively sputtering onto a rigid disc substrate and underlayer, a magnetic recording layer and a carbon overcoat which protects the magnetic layer from wear and reduces the frictional forces between the disc and the read\write head.

It is desirable that such media have excellent magnetic recording properties, for example, a high coercivity, high amplitude and low noise and numerous approaches have been described for improving the magnetic recording performance. One approach has focused on tailoring the underlayer to provide a surface that controls the grain size of the magnetic layer and/or permits epitaxial growth of the magnetic layer.

Approaches to tailoring the underlayer to control the ultimate magnetic recording properties of the disc have included controlling the thickness of the underlayer, the deposition conditions of the underlayer, the composition of the underlayer and/or the number of underlayers present. For example, increasing the thickness of the underlayer has been shown to improve coercivity, up to underlayer thicknesses of several thousand angstroms, e.g. 2,000–5,000 Å (Fisher, et al., *IEE Trans. Magn.*, 22:352 (1986), Johnson, K. E., et al., *J. Appl, Phys.*, 67(9):4686 (1990)). The effect of depositing a chromium underlayer under a substrate bias has been examined (Lal, B. B. et al., *IEEE Trans. Magn.*, 30(6):3954 (1994) and shown to improve coercivity.

Magnetic media having underlayers varying in composition have been described, for example, underlayers composed of chromium-based alloys such as CrMo, CrW, CrV (Ahlert, U.S. Pat. No. 5,051,288). Others have described magnetic media having more than one underlayer as an approach to controlling or improving magnetic recording properties (Shiroishi, et al. U.S. Pat. No. 4,833,020; Suzuki, et al. U.S. Pat. No. 5,316,844). There is still a need, however, for media which have improved recording performance.

SUMMARY OF THE INVENTION

Accordingly, it is an object of the invention to provide a magnetic recording disc having improved magnetic recording properties.

It is another object of the invention to provide a magnetic recording medium having an underlayer structure which provides an improved signal amplitude.

In one aspect, the invention includes a magnetic recording medium, comprising a nonmagnetic, metallic, rigid disc substrate; a first underlayer formed on the substrate, the first underlayer being composed of chromium or a chromium-based alloy and having a thickness between 25–200 Å; a second underlayer formed on the first underlayer and being composed of a chromium-based alloy and having a thickness between 25–200 Å; a magnetic recording layer formed on the second underlayer; and a protective overcoat.

In one embodiment the first underlayer is composed of a binary alloy of chromium and between 5–30 atomic percent of an element selected from the group consisting of Mo, Ta, Mn, V, W, Ru, Ti, Hf, Zr, Pt, Si, Ni, Al, Cu, B and Nb.

In another embodiment the second underlayer is composed of a binary alloy of chromium and between 5–30 atomic percent of an element selected from the group consisting of Mo, Ta, Mn, V, W, Ru, Ti, Hf, Zr, Pt, Si, Ni, Al, Cu. B and Nb.

In yet another embodiment, the first underlayer is composed of chromium and the second underlayer is composed of a chromium-based alloy. In a preferred embodiment the second underlayer is CrMo, CrTa, CrMn, CrV, CrW or CrRu.

In another embodiment, the second underlayer is composed of a ternary alloy of chromium and between 5–30 atomic percent of two elements selected from the group consisting of Mo, Ta, Mn, V, W, Ru, Ti, Hf, Zr, Pt, Si, Ni, Al, Cu, B and Nb.

In still another embodiment, the first and second underlayers are of the same thickness.

The magnetic recording layer, in one embodiment, is composed of cobalt, chromium, platinum and tantalum.

In another aspect, the invention includes an improvement in a magnetic recording medium formed on a rigid disc substrate and having a chromium underlayer, a magnetic recording layer and a protective overcoat. The improvement includes a second underlayer disposed between the chromium underlayer and the magnetic recording layer, the second underlayer composed of a chromium alloy containing between 5–30 atomic percent of at least one element selected from the group consisting of Mo, Ta, Mn, V, W, Ru, Ti, Hf, Zr, Pt, Si, Ni, Al, Cu, B and Nb.

In one embodiment of this aspect, the second underlayer is composed of a binary alloy of chromium and one element from the recited group. In a preferred embodiment, the second underlayer is CrMo, CrTa, CrMn, CrV, CrW or CrRu.

In another embodiment, the second underlayer is composed of a ternary alloy of chromium and two elements from the recited group.

The second underlayer has a thickness between 25–200 Å.

These and other objects and features of the invention will be more fully appreciated when the following detailed description of the invention is read in conjunction with the accompanying drawings.

DETAILED DESCRIPTION OF THE INVENTION

I. Magnetic Recording Medium

Figure 1:
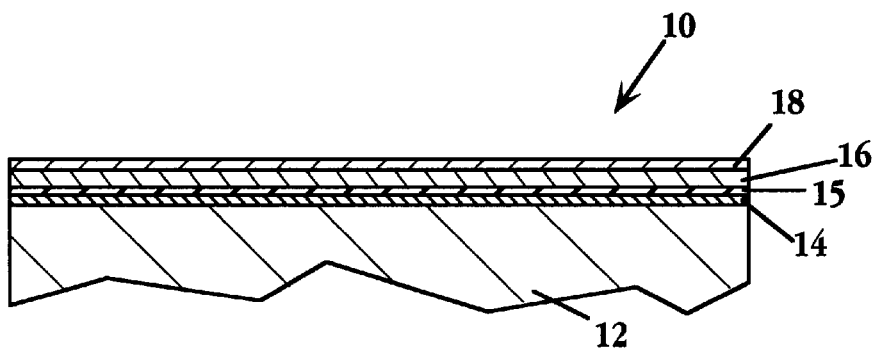
FIG. 1 is a sectional view of a thin-film magnetic disc in accordance with one embodiment of the present invention.

FIG. 1 shows in cross sectional view, a fragmentary portion of a thin-film medium or disc 10 formed in accordance with the invention. The disc generally includes a rigid substrate 12, and forming successive thin-film layers over the substrate, a first crystalline underlayer 14, a second crystalline underlayer 15, a magnetic thin-film layer 16 and a protective overcoat layer 18. It will be appreciated that the disc is symmetrical with respect to its upper and lower surfaces, the lower portion of the disc not being shown in the figure.

The substrate is a metallic, such as a conventional surface-coated, aluminum substrate of the type used commonly for digital recording medium. Conventional substrates are typically 130 mm or 95 mm in outer diameter (5.1 inches and 3.74 inches respectively), with corresponding inner diameters of 40 mm and 25 mm (1.57 inches and 0.98 inches), respectively.

The substrate is generally textured by any of the methods known in the art to achieve suitable friction during contact-start-stop with the recording head, yet is sufficiently smooth for acceptable flying head height.

Formed directly on the plated substrate is a first underlayer 14. In accordance with the invention, underlayer 14 is composed of chromium (Cr) and is deposited to a desired thickness of typically between 25–200 Å by techniques known in the art, such as varying the sputtering time and/or rate.

A second underlayer 15 is deposited on first underlayer 14. Second underlayer 15 is composed of a chromium-based alloy, which refers to an alloy containing at least 50 atomic percent chromium. In a preferred embodiment of the invention, the chromium-based alloy includes between 70–95 atomic percent chromium and between 5–30 atomic percent of an element selected from Mo, Ta, Mn, V, W, Ru, Ti, Hf, Zr, Pt, Si, Ni, Al, Cu, B and Nb. The alloy can be binary or ternary, and exemplary binary alloys include CrRu, CrTi and CrMo. The second underlayer is deposited to a desired thickness of typically between 25–200 Å by techniques known in the art, such as varying the sputtering time and/or rate.

As will be described below, in studies performed in support of the invention, media having a two-layer underlayer were prepared, where the first underlayer was composed of chromium and the second underlayer was composed of CrMo (80/20), CrTa (90/10), CrMn (80/20), CrV (80/20), CrW (90/10) or CrRu (90/10). In these studies, the first and second underlayers are of the same thickness, however, it will be appreciated that they may be of different thicknesses in the preferred range recited.

Magnetic layer 16 is preferably a cobalt-based alloy which is formed on the underlayer by sputtering or the like to a desired thickness, preferably between 100–800 Å. A "cobalt-based" alloy refers to an alloy containing at least 50 atomic percent cobalt. Exemplary binary cobalt-based alloys include Co/Cr or Co/Ni, and exemplary ternary, quaternary, and five-element alloys include Co/Cr/Ta, Co/Ni/Pt, Co/Ni/Cr, Co/Cr/Ta/Pt, Co/Ni/Cr/Pt, and Co/Cr/Ni/Pt/B. A preferred cobalt-based alloy is composed of 80–90% cobalt, 5–20% chromium and 2–10% tantalum. Another preferred cobalt-based alloy is composed of 70–90% cobalt, 5–20% chromium, 2–10% tantalum and 1–8% platinum.

In the studies described below, magnetic recording media having the dual underlayer structure and a magnetic recording layer composed of cobalt, chromium, tantalum and platinum were prepared.

Overcoat 18 in FIG. 1 is formed by sputter deposition onto the magnetic recording layer. The overcoat may be composed of carbon, silicon oxide, silicon nitride, or other suitable material giving wear-resistant, protective properties to the medium. Preferably, the overcoat is formed of carbon and has a thickness between 80–250 Å.

II. Method of Preparing the Medium

The magnetic recording medium of the invention is prepared in conventional sputtering systems, such as those available from Intevac (Santa Clara, Calif.), Circuits Processing Apparatus (Fremont, Calif.), ULVAC (Japan), Leybald Heraeus (Germany), VACTEC (Boulder, Colo.), or ANELVA (Japan). These systems are double-sided, in-line, high-throughput machines having two interlocking systems, for loading and unloading. It will be appreciated that DC, RF and DC/RF systems, conventional or magnetron, are suitable.

Figure 2:
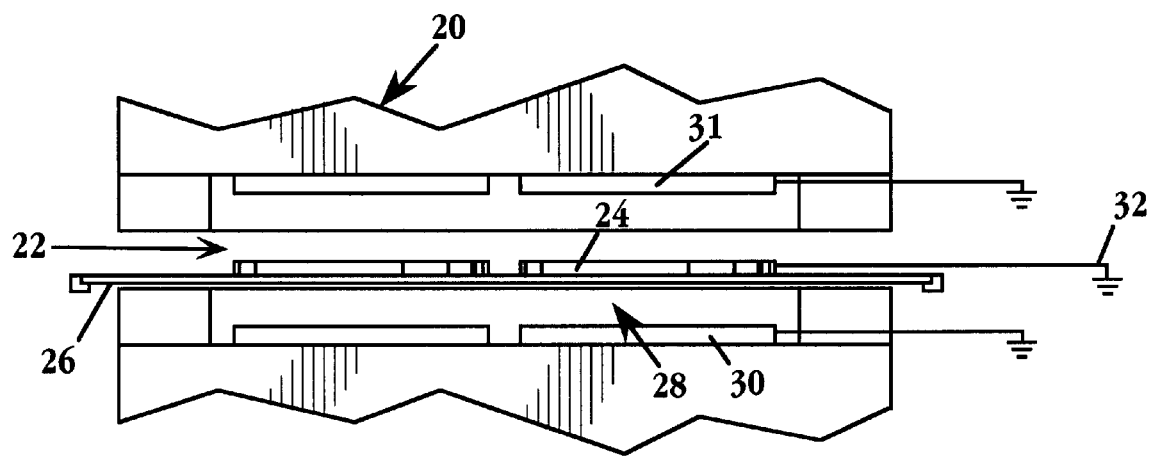
FIG. 2 is a schematic illustration of a portion of a sputtering apparatus used in forming the medium of the invention.

The sputtering systems include a series of sputtering stations or chambers, for deposition of the layers comprising the medium. FIG. 2 shows, in schematic view, a portion of such a sputtering apparatus 20 which is used for producing the longitudinal magnetic recording medium described in section I. Apparatus 20 includes a vacuum chamber 22 having at least four stations at which sputtering or heating operations occur. A heating station (not shown) at the upstream end of the chamber has a plurality of infrared lights which are arrayed for heating both sides of a substrate, such as substrate 24, carried through the station in the chamber on an aluminum disc holder 26.

Just downstream of the heating station is a first sputtering station 28 at which the first underlayer is formed on the substrate, in a manner to be described. The station includes a pair of targets, such as targets 30, 31, effective to sputter chromium or a chromium-based alloy onto opposite sides of the substrate or substrates in the chamber.

Also included in the apparatus is a DC power source 32 for placing a selected voltage potential on substrate 24. More specifically, the power source is designed to place a DC voltage bias on the substrate of −50 to −750 volts with respect to ground in the sputtering chamber where the first underlayer and, optionally, when the second underlayer, are deposited.

Another sputtering station for deposition of the second underlayer is downstream of the station for deposition of the first underlayer. This station also includes a pair of targets effective to deposit the desired chromium alloy onto the substrate.

Another sputtering station is designed for sputtering the magnetic recording layer onto the underlayer. The station includes a pair of sputtering targets for sputtering the magnetic film alloy onto the underlayer-coated substrate. The targets in this station are formed of a Co-based alloy in one of the exemplary compositions given above. The alloy is formed and shaped for use as a sputtering target by conventional metallurgical methods.

In operation, the sputtering chamber is evacuated to pressure of about $10^{-7}$ torr, and argon gas is introduced into the chamber to a final sputtering pressure of 5–20 mTorr. A preferred argon gas pressure is 6 mTorr.

The substrate is heated in the heating station to a selected temperature before advancing into the sputtering chamber. The heating conditions in the apparatus are preferably adjusted to achieve a substrate temperature of between about 220° C. and 270° C., and preferably about 250° C.

The heated substrate is moved into the first sputtering chamber, and the first underlayer is deposited onto the disc surface by sputtering. When formation of the first underlayer is complete, the substrate is advanced to the next sputtering chamber for deposition of the second underlayer, and then advanced again to the next chamber for deposition of the cobalt-based magnetic recording layer. Finally, a protective overcoat is deposited on the medium in a sputtering station downstream from the station for deposition of the magnetic layer.

After formation of the overcoat, the disc may be coated with a conventional 25–150 Å overcoat layer of carbon or the like and then coated with a lubricant, such as a perfluoropolyether.

III. Medium Properties

In studies performed in support of the invention, magnetic media were prepared as described above. More specifically, a randomly polished NiP/Al substrate was heated to 250° C. and a first underlayer material of chromium was sputtered deposited to a selected thickness under a substrate bias of −250 V. The second underlayer was deposited to a selected thickness under a substrate bias of −250 V and was composed of CrMo (80/20), CrTa (90/10), CrMn (80/20), CrV (80/20), CrW (90/10) or CrRu (90/10). A magnetic recording layer of CoCrTaPt (74/17/4/5) or of CoCrTaPt (77/15/4/4) was deposited to a thickness of between 100–400 Å. A carbon overcoat was deposited to a thickness of between 25–150 Å, followed by a 10–20 Å layer of a standard lubricant. Comparative media were prepared similarly, except that the underlayer consisted of a single layer deposited under a substrate bias of −250 V and composed of the indicated alloy.

Bulk magnetic properties were determined by vibrating sample magnetometry (VSM) conventionally. Magnetic recording testing was carried out on a Guzik Spin-Stand at 5400 rpm for AC0signal-to-noise ratio and at 7200 rpm for parametric measurements at 0.83" ID disc radius. A dual element head consisting of a thin inductive head for writing and a magnetoresistive head for read-back and including a spectrum analyzer for noise roll-off was employed. The head flying height was 1.5 μinches, the head gap length was 0.30 μm. The high frequency amplitude was measured at 78 MHz. High frequency amplitude and signal-to-noise ratio were measured from 150 kfci to 213 kfci recording density at the inner diameter of the disc using a Guzik R/W Analyzer and an HP-Spectrum Analyzer.

A. Media Having a CrMo (80/20) Dual Underlayer

Figure 3A:
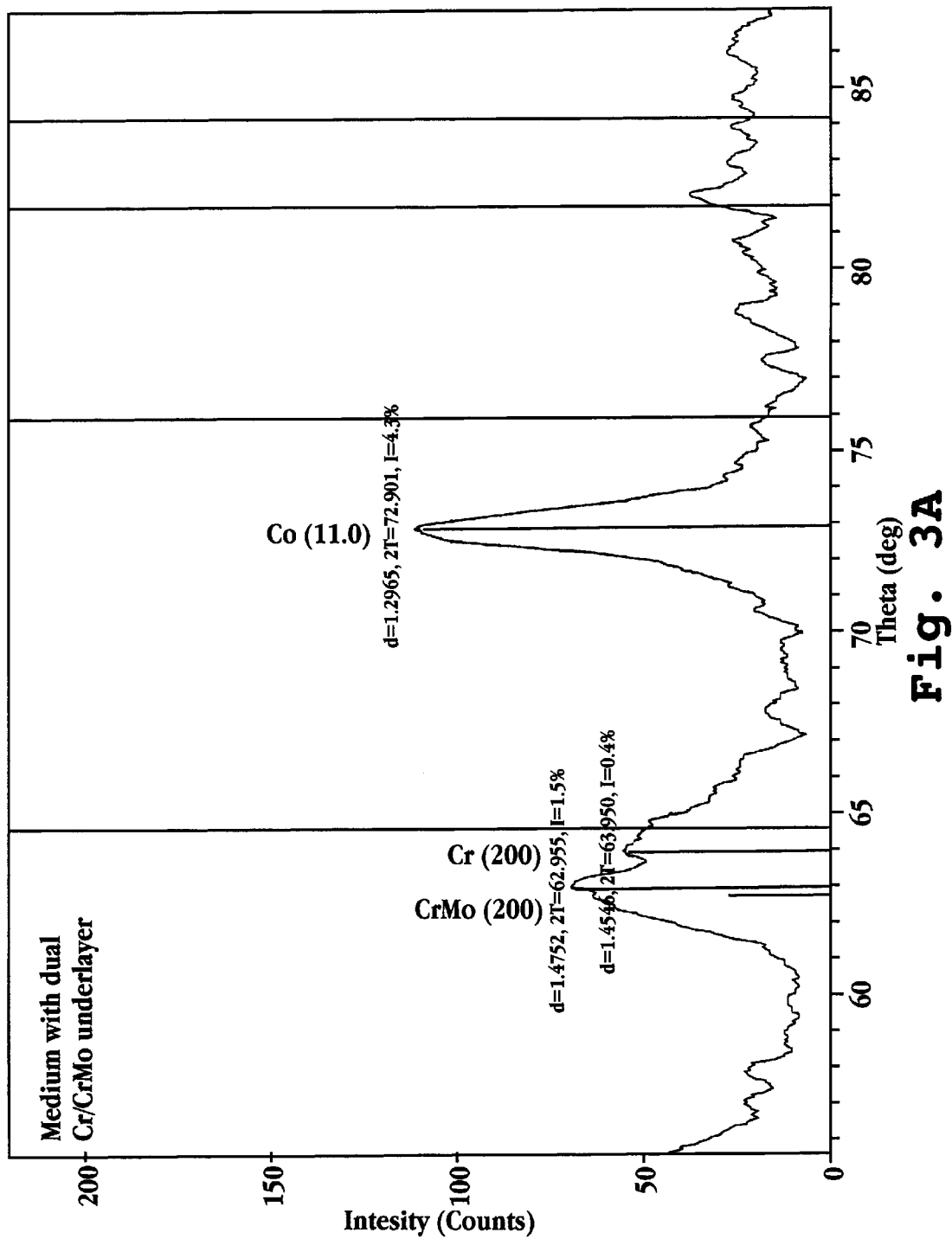
FIGS. 3A–3B are X-ray diffraction patterns for a magnetic medium having a first underlayer of chromium and a second underlayer of CrMo (80/20) (FIG. 3A) and a conventional medium having a single underlayer of CrMo (80/20) (FIG. 3B)
Figure 3B:
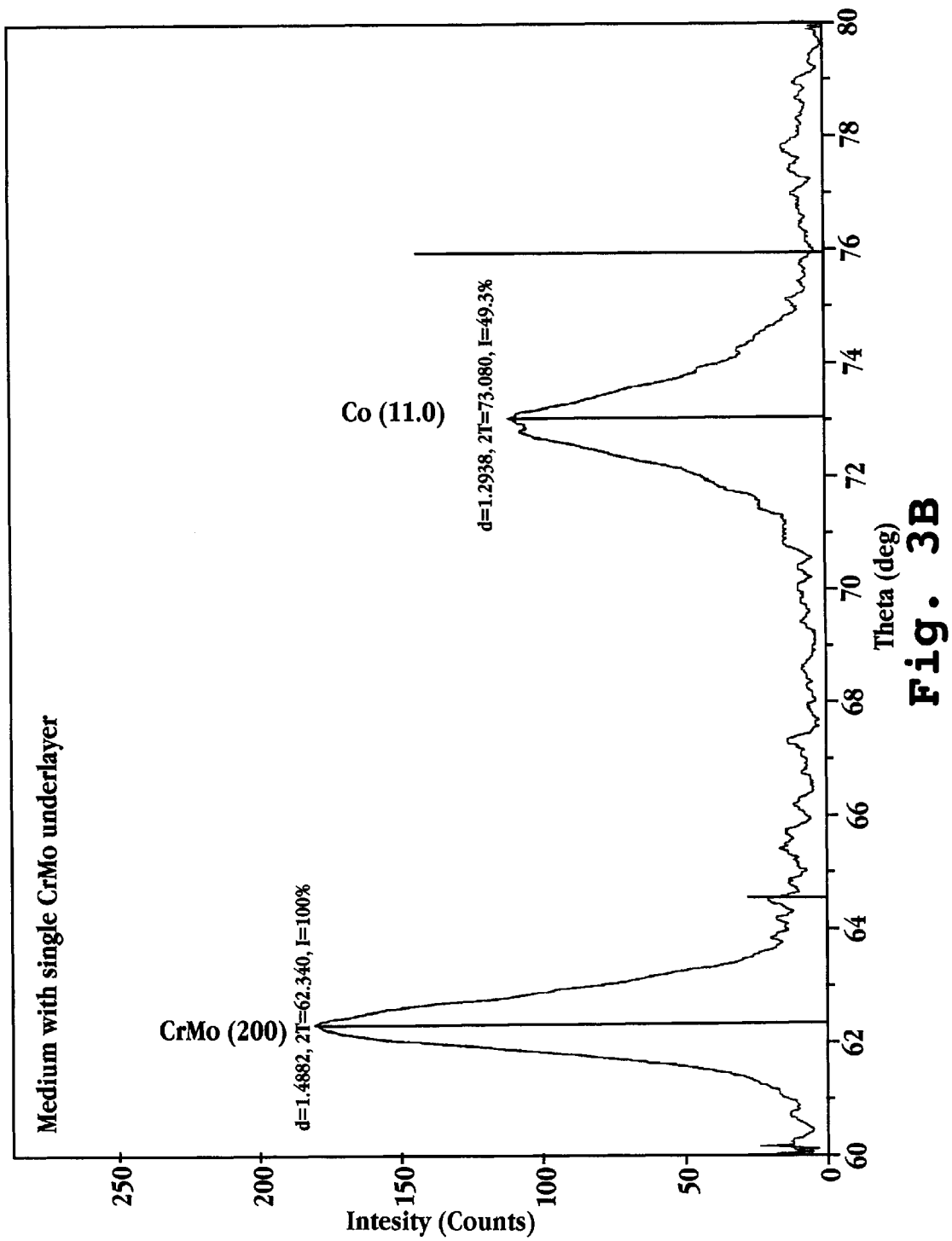

FIGS. 3A–3B are X-ray diffraction patterns for media prepared with the dual underlayer of the invention (FIG. 3A) and for a comparative media having a single underlayer of CrMo (FIG. 3B). In FIG. 3A, the peak at $2\Theta=63°$ corresponds to the CrMo reflection and the reflection at $2\Theta=64°$ corresponds to the first Cr underlayer. In FIG. 3B, a single CrMo reflection at $2\Theta=62.5°$ is observed.

Table 1 summarizes the parametric measurements of media having a dual underlayer structure of Cr/CrMo. The first Cr underlayer had a thickness of 105 Å and was deposited under a bias of −250 V. The second CrMo (80/20) underlayer was deposited to thickness of 105 Å and was deposited under a substrate bias of −250 V. The comparative media had a single underlayer of CrMo having a thickness of 180 Å, which was deposited under a substrate bias of −250 V.

TABLE 1

Media with CrMo (80/20) Underlayer

| Test Medium | Hc (Oe) | Mrt (memu /cm$^2$) | HF[3] (μV) | LF[3] (μV) | Res.[3] (%) | OW[3] (dB) | PW$_{50}$[3] (ns) |
|---|---|---|---|---|---|---|---|
| Medium with Dual Underlayer[1] | 2916 | 0.60 | 218 | 798 | 27.4 | 34.5 | 14.34 |
| Comparative Medium with Single Underlayer[2] | 2952 | 0.60 | 209 | 775 | 27.1 | 35.1 | 14.37 |

[1]First underlayer of chromium (105 Å), second underlayer of CrMo (80/20) (105 Å); magnetic layer of CoCrTaPt (74/17/4/5).
[2]Single underlayer of CrMo (80/20) (180 Å); magnetic layer of CoCrTaPt (74/17/4/5).
[3]Measured at ID = 0.83"; HF = 78 MHz.

As seen in the table, media prepared in accordance with the invention have an improved high frequency amplitude and an improved low frequency amplitude.

Figure 4:
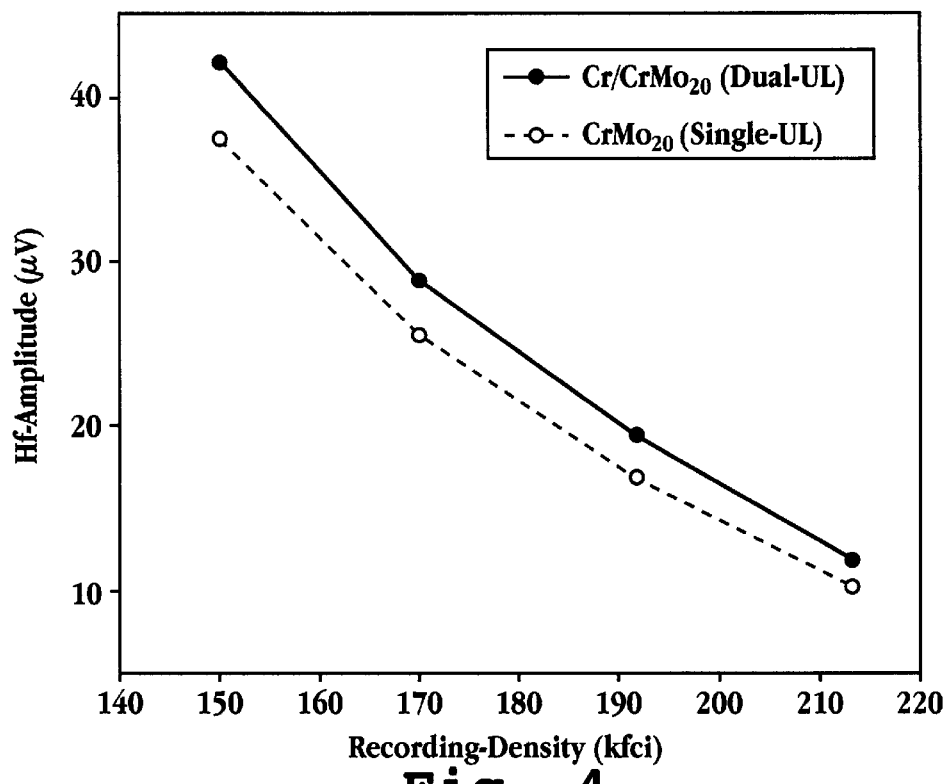
FIG. 4 is a plot of high frequency amplitude, in 1V, against recording density, in kiloflux changes per inch (kfci) for magnetic media having a first underlayer of chromium and a second underlayer of CrMo (80/20) (solid circles) and a conventional medium having a single underlayer of CrMo (80/20) (open circles)

FIG. 4 shows the high frequency amplitude as a function of recording density, in kiloflux changes per inch (kfci) for magnetic media described above in Tables 1 and 2. In the figure, the media having a dual Cr/CrMo underlayer structure is represented by the closed circles and the comparative media, e.g., media having a single underlayer of CrMo is represented by the open circles. The medium having the dual underlayer structure has a higher HF-amplitude over the range of recording density tested.

Figure 5:
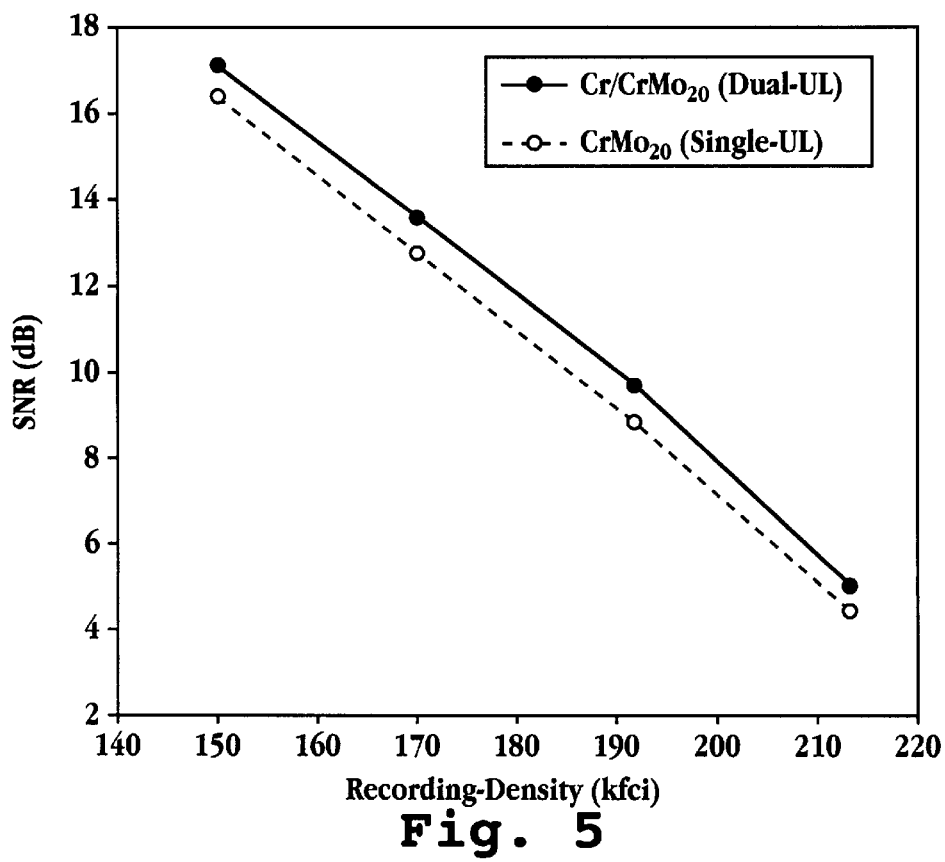
FIG. 5 is a plot of signal-to-noise ratio, in dB, against recording density, in kiloflux changes per inch (kfci) for magnetic media having a first underlayer of chromium and a second underlayer of CrMo (80/20) (solid circles) and a conventional medium having a single underlayer of CrMo (80/20) (open circles)

FIG. 5 shows the signal-to-noise ratio, in dB, against recording density, in kiloflux changes per inch (kfci) for media of FIG. 4, where again the medium having a dual Cr/CrMo underlayer structure is represented by the closed circles and the comparative media by the open circles. An improved signal-to-noise ratio over the range of recording density tested is achieved.

B. Media Having a CrTa (90/10) Underlayer

Media having a dual underlayer of chromium and CrTa (90/10) were also prepared in support of the invention. The first Cr underlayer had a thickness of 75 Å and was deposited under a bias of −250 V. The second CrTa (90/10) underlayer was deposited to thickness of 75 Å and was deposited under a substrate bias of −250 V. The comparative media had a single underlayer of CrTa having a thickness of 240 Å, which was deposited under a substrate bias of −250 V. The coercivity (Hc), magnetic remanence thickness product (Mrt) and remanence squareness (S') for the media are shown in Table 2.

TABLE 2

Media with CrTa (90/10) Underlayer

| Test Medium | Hc (Oe) | Mrt (memu/cm²) | S' |
|---|---|---|---|
| Medium with Dual Underlayer[1] | 2440 | 0.56 | 0.70 |
| Comparative Medium with Single Underlayer[2] | 3210 | 0.65 | 0.83 |

[1]First underlayer of chromium (75 Å), second underlayer of CrTa (90/10) (75 Å); magnetic layer of CoCrTaPt (74/17/4/5).
[2]Single underlayer of CrTa (90/10) (240 Å); magnetic layer of CoCrTaPt (74/17/4/5).

As seen in Table 2, media having a dual Cr/CrTa underlayer have a higher coercivity, higher magnetic remanence thickness product (Mrt) and remanence squareness (S') when compared to the medium having a single underlayer of CrTa (90/10).

C. Media Having a CrMn (80/20) Underlayer

Media having a dual underlayer of chromium and CrMn (80/20) were also prepared in support of the invention. The first Cr underlayer had a thickness of 120 Å and was deposited under a bias of −250 V. The second CrMn (80/20) underlayer was deposited to thickness of 120 Å and was deposited under a substrate bias of −250 V. The comparative media had a single underlayer of CrMn having a thickness of 180 Å, which was deposited under a substrate bias of −250 V. The parametrics are shown in Table 3.

TABLE 3

Media with CrMn (80/20) Underlayer

| Test Medium | Hc (Oe) | Mrt (memu/cm²) | HF[3] (μV) | LF[3] (μV) | Res.[3] (%) | OW[3] (dB) | PW$_{50}$[3] (ns) |
|---|---|---|---|---|---|---|---|
| Medium with Dual Underlayer[1] | 3080 | 0.66 | 191 | 614 | 31.2 | 28.5 | 24.72 |
| Comparative Medium with Single Underlayer[2] | 3100 | 0.65 | 177 | 598 | 29.6 | 29.5 | 24.69 |

[1]First underlayer of chromium (120 Å), second underlayer of CrMn (80/20) (120 Å); magnetic layer of CoCrTaPt (74/17/4/5).
[2]Single underlayer of CrMn (80/20) (240 Å); magnetic layer of CoCrTaPt (74/17/4/5).
[3]Measured at ID = 0.83"; HF = 47 MHz; RPM = 5400.

Improvements in the HF and LF signal amplitude are observed.

Figure 6:
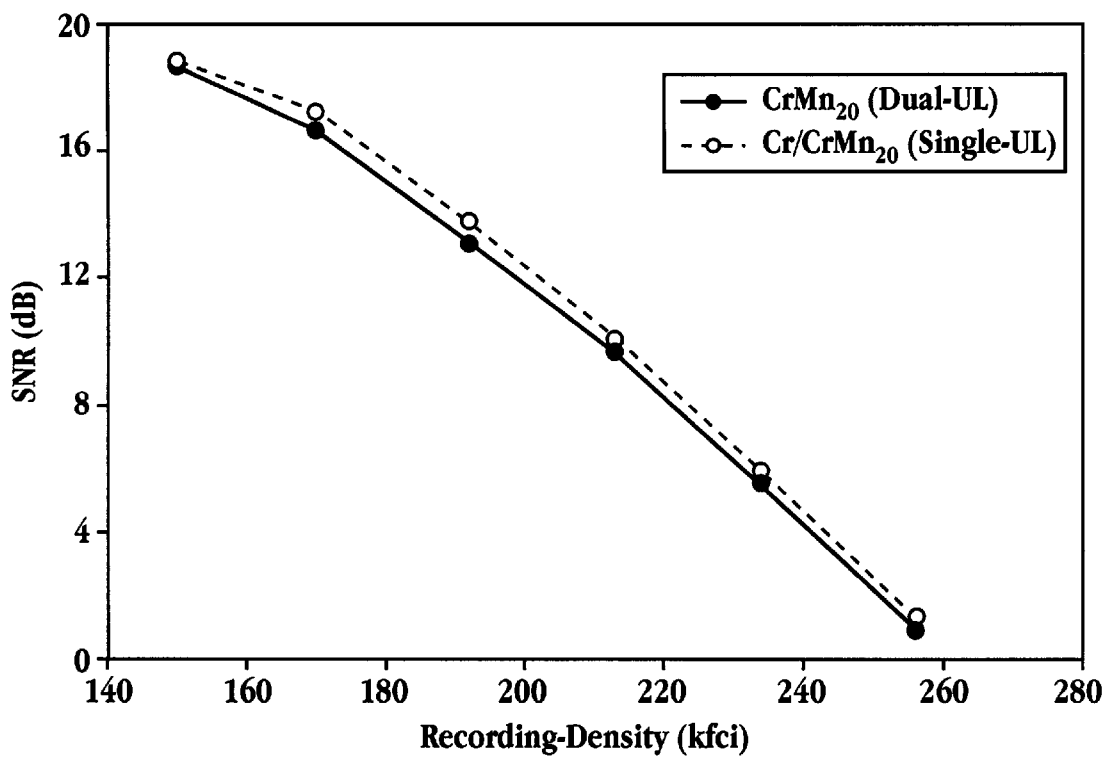
FIG. 6 is a plot of signal-to-noise ratio, in dB, against recording density, in kiloflux changes per inch (kfci) for magnetic media having a first underlayer of chromium and a second underlayer of CrMn (80/20) (open circles) and a conventional medium having a single underlayer of CrMn (80/20) (solid circles)

FIG. 6 shows the signal-to-noise ratio (SNR) as a function of recording density for the magnetic media having a first underlayer of chromium and a second underlayer of CrMn (80/20) (open circles) and for the conventional medium having a single underlayer of CrMn (80/20) (solid circles). As seen an improved SNR is achieved by forming a dual underlayer structure.

D. Media Having a CrV (80/20) Underlayer

Media having a dual underlayer of chromium and CrV (80/20) were also prepared in support of the invention. The first Cr underlayer had a thickness of 150 Å and was deposited under a bias of −250 V. The second CrV (80/20) underlayer was deposited to thickness of 150 Å and was deposited under a substrate bias of −250 V. The comparative media had a single underlayer of CrV having a thickness of 320 Å, which was deposited under a substrate bias of −250 V. The parametrics are shown in Table 4.

TABLE 4

Media with CrV (80/20) Underlayer

| Test Medium | Hc (Oe) | Mrt (memu/cm²) | HF[3] (μV) | LF[3] (μV) | Res.[3] (%) | OW[3] (dB) | PW$_{50}$[3] (ns) |
|---|---|---|---|---|---|---|---|
| Medium with Dual Underlayer[1] | 3200 | 0.65 | 165 | 471 | 35.1 | 30.2 | 21.91 |
| Comparative Medium with Single Underlayer[2] | 3160 | 0.61 | 152 | 452 | 33.8 | 30.6 | 22.08 |

[1]First underlayer of chromium (150 Å), second underlayer of CrV (80/20) (150 Å); magnetic layer of CoCrTaPt (77/15/4/5).
[2]Single underlayer of CrV (80/20) (320 Å); magnetic layer of CoCrTaPt (77/15/4/5).
[3]Measured at ID = 0.83"; HF = 48 MHz; RPM = 5400.

Improvements in the HF and LF signal amplitude are observed.

Figure 7:
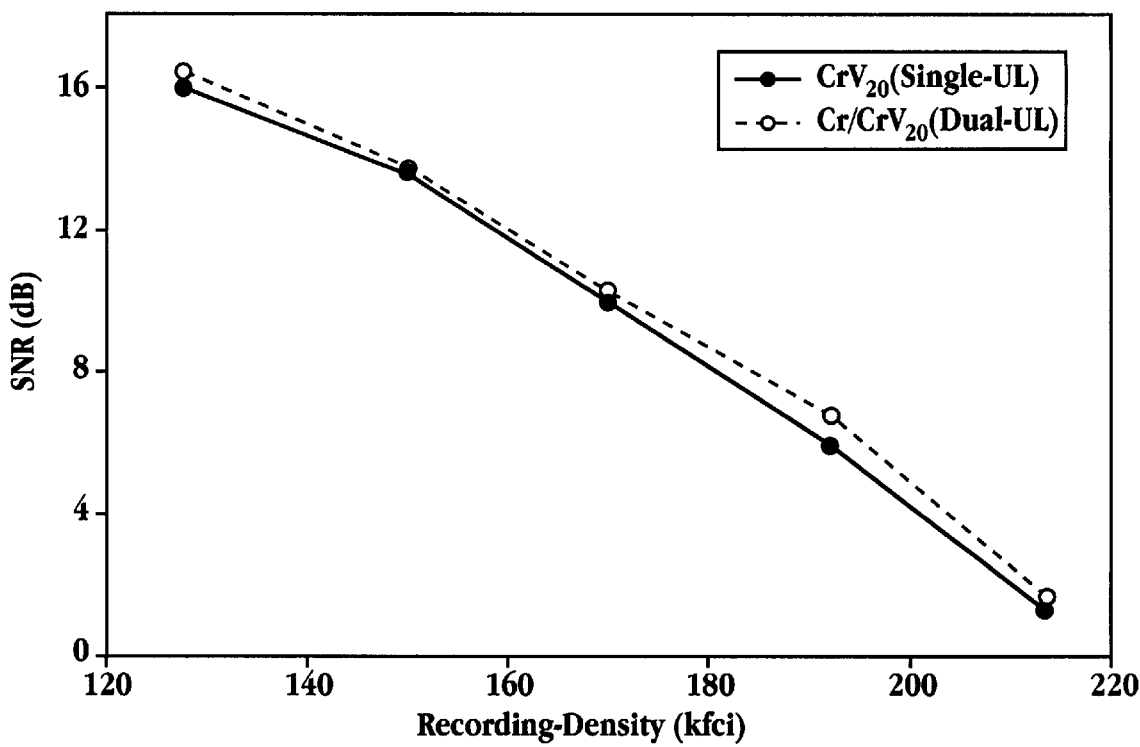
FIG. 7 is a plot of signal-to-noise ratio, in dB, against recording density, in kiloflux changes per inch (kfci) for magnetic media having a first underlayer of chromium and a second underlayer of CrV (80/20) (open circles) and a conventional medium having a single underlayer of CrV (80/20) (solid circles)

FIG. 7 shows the signal-to-noise ratio (SNR) as a function of recording density for the magnetic medium having a first underlayer of chromium and a second underlayer of CrV (80/20) (open circles) and for the conventional medium having a single underlayer of CrV (80/20) (solid circles). As seen, the dual underlayer medium has a higher SNR.

E. Media Having a CrW (90/10) Underlayer

Media having a dual underlayer of chromium and CrW (90/10) were also prepared in support of the invention. The first Cr underlayer had a thickness of 180 Å and was deposited under a bias of −250 V. The second CrW (90/10) underlayer was deposited to thickness of 180 Å and was deposited under a substrate bias of −250 V. The comparative media had a single underlayer of CrW having a thickness of 360 Å, which was deposited under a substrate bias of −250 V. Media parametrics are shown in Table 5.

TABLE 5

Media with CrW (90/10) Underlayer

| Test Medium | Hc (Oe) | Mrt (memu/cm²) | HF[3] (μV) | LF[3] (μV) | Res.[3] (%) | OW[3] (dB) | PW$_{50}$[3] (ns) |
|---|---|---|---|---|---|---|---|
| Medium with Dual Underlayer[1] | 2990 | 0.64 | 162 | 474 | 34.3 | 33.5 | 21.95 |
| Comparative Medium with Single Underlayer[2] | 3000 | 0.62 | 158 | 466 | 33.8 | 34.3 | 22.07 |

Figure 8:
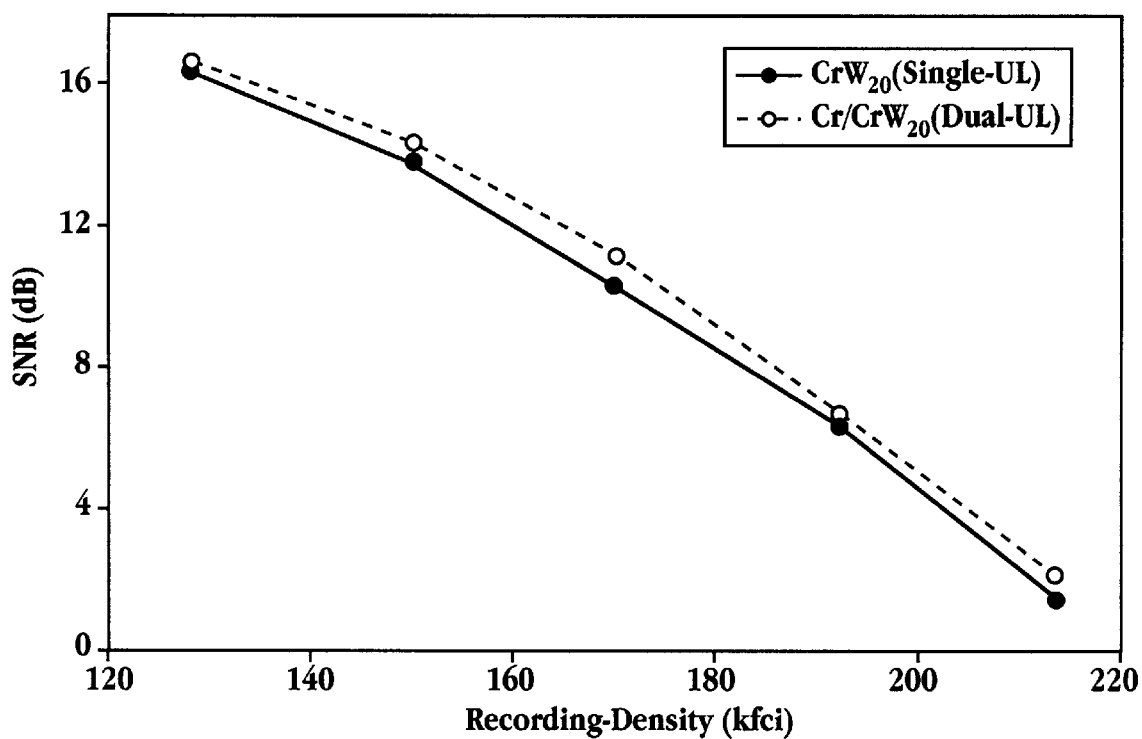
FIG. 8 is a plot of signal-to-noise ratio, in dB, against recording density, in kiloflux changes per inch (kfci) for magnetic media having a first underlayer of chromium and a second underlayer of CrW (90/10) (open circles) and a conventional medium having a single underlayer of CrW (90/10) (solid circles)

[1]First underlayer of chromium (180 Å), second underlayer of CrW (90/10) (180 Å); magnetic layer of CoCrTaPt (77/15/4/5).
[2]Single underlayer of CrW (90/10) (360 Å); magnetic layer of CoCrTaPt (77/15/4/5).
[3]Measured at ID = 0.83"; HF = 48 MHz FIG. 8 shows the signal-to-noise ratio (SNR), as a function of recording density for the magnetic medium having a first underlayer of chromium and a second underlayer of CrW (90/10) (open circles) and a conventional medium having a single underlayer of CrW (90/10) (solid circles). As seen, the dual underlayer medium provides improved parametric properties, in particular a higher SNR, 0.5–0.7 dB increase, when compared to the single underlayer medium.

F. Media Having a CrRu (90/10) Underlayer

Media having a dual underlayer of chromium and CrRu (90/10) were also prepared in support of the invention. The first Cr underlayer had a thickness of 180 Å and was deposited under a bias of −250 V. The second CrRu (90/10) underlayer was deposited to thickness of 180 Å and was deposited under a substrate bias of −250 V. The comparative media had a single underlayer of CrRu having a thickness of 300 Å, which was deposited under a substrate bias of −250 V. A second comparative medium with a Cr single underlayer having a thickness of 300 Å was also prepared. The magnetic layer was CoCrPtTa (74/17/5/4).

Figure 9:
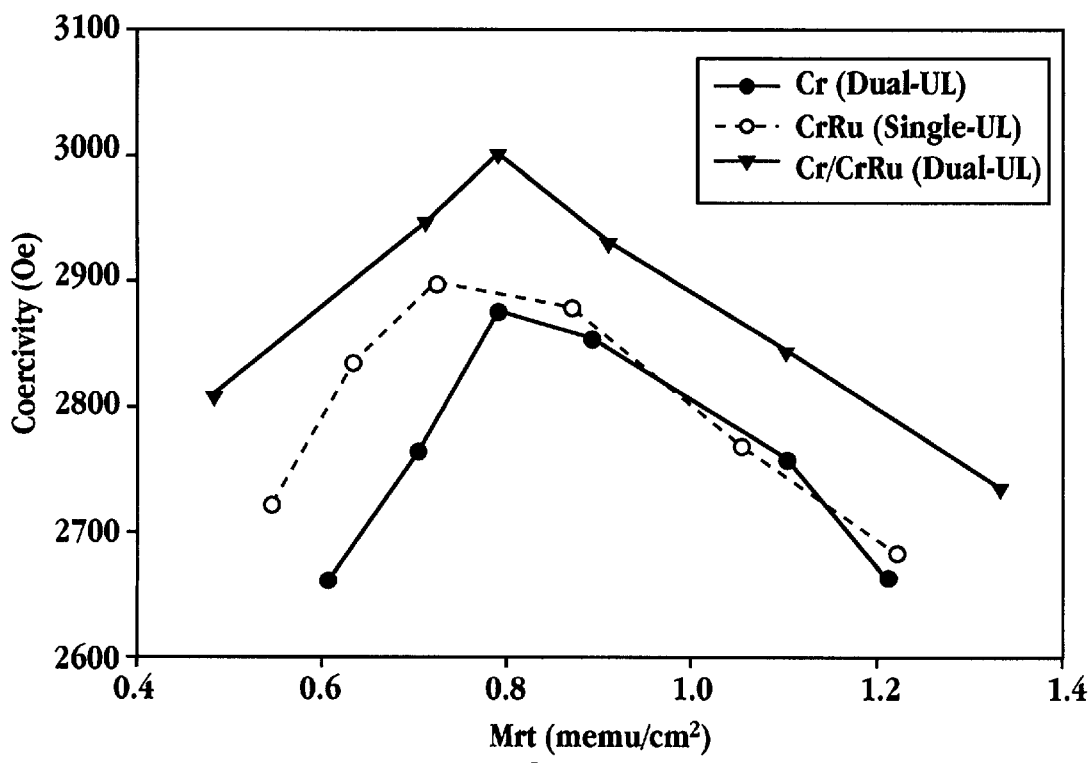
FIG. 9 is a plot of coercivity, in Oe, as a function of magnetic remanence thickness product, Mrt in memu/cm$^2$, for magnetic media having a first underlayer of chromium and a second underlayer of CrRu (90/10) (solid inverted triangles), and conventional media having a single underlayer of CrRu (90/10) (open circles) and of Cr (closed circles).

FIG. 9 shows the coercivity as a function of magnetic remanence thickness product, Mrt for the magnetic media having a first underlayer of chromium and a second underlayer of CrRu (90/10) (solid inverted triangles), and for the comparative media having a single underlayer of CrRu (90/10) (open circles) or of Cr (closed circles). The dual underlayer medium had a higher coercivity in the range of 0.5–1.2 memu/cm$^2$ when compared to the medium having a CrRu single underlayer and to the medium having a Cr single underlayer.

Although the invention has been described with respect to particular embodiments, it will be apparent to those skilled in the art that various changes and modifications can be made without departing from the invention.

What is claimed is:

1. A magnetic recording medium, comprising
   a nonmagnetic, metallic, rigid disc substrate,
   a first underlayer formed on the substrate, the first underlayer being composed of chromium and having a thickness between 25–200 Å,
   a second underlayer formed on the first underlayer and being composed of a chromium-based alloy and having a thickness between 25–200 Å,
   a magnetic recording layer formed on the second underlayer, and
   a protective overcoat.

2. The medium of claim 1, wherein the second underlayer is composed of a binary chromium-based alloy of chromium and between 5–30 atomic percent of an element selected from the group consisting of Mo, Ta, Mn, V, W, Ru, Ti, Hf, Zr, Pt, Si, Ni, Al, Cu, B and Nb.

3. The medium of claim 1, wherein the second underlayer is composed of an alloy containing chromium and between 5–30 atomic percent Mo.

4. The medium of claim 1, wherein the second underlayer is composed of an alloy containing chromium and between 5–30 atomic percent V.

5. The medium of claim 1, wherein the second underlayer is composed of an alloy containing chromium and between 5–30 atomic percent W.

6. The medium of claim 1, wherein the second underlayer is composed of an alloy containing chromium and between 5–30 atomic percent Mn.

7. The medium of claim 1, wherein the second underlayer is composed of an alloy containing chromium and between 5–30 atomic percent Ta.

8. The medium of claim 1, wherein the second underlayer is composed of an alloy containing chromium and between 5–30 atomic percent Ru.

9. The medium of claim 1, wherein the second underlayer is composed of a ternary alloy of chromium and between 5–30 atomic percent of two elements selected from the group consisting of Mo, Ta, Mn, V, W, Ru, Ti, Hf, Zr, Pt, Si, Ni, Al, Cu, B and Nb.

10. The medium of claim 1, wherein the first and second underlayers are of even thickness.

11. The medium of claim 1, wherein the magnetic recording layer is composed of cobalt, chromium, platinum and tantalum.

12. An improvement in a magnetic recording medium formed on a rigid disc substrate and having a chromium underlayer, a magnetic recording layer and a protective overcoat, the improvement comprising,
    a second underlayer disposed between the chromium underlayer and the magnetic recording layer, the second underlayer composed of a chromium alloy containing between 5–30 atomic percent of at least one element selected from the group consisting of Mo, Ta, Mn, V, W, Ru, Ti, Hf, Zr, Pt, Si, Ni, Al, Cu, B and Nb.

13. The medium of claim 12, wherein the second underlayer is composed of a binary alloy of chromium and one element from the recited group.

14. The medium of claim 12, wherein the second underlayer is composed of chromium and between 5–30 atomic percent Mo.

15. The medium of claim 12, wherein the second underlayer is composed of an alloy containing chromium and between 5–30 atomic percent V.

16. The medium of claim 12, wherein the second underlayer is composed of an alloy containing chromium and between 5–30 atomic percent W.

17. The medium of claim 12, wherein the second underlayer is composed of an alloy containing chromium and between 5–30 atomic percent Mn.

18. The medium of claim 12, wherein the second underlayer is composed of an alloy containing chromium and between 5–30 atomic percent Ta.

19. The medium of claim 12, wherein the second underlayer is composed of an alloy containing chromium and between 5–30 atomic percent Ru.

20. The medium of claim 12, wherein the second underlayer is composed of a ternary alloy of chromium and two elements from the recited group.

21. The medium of claim 12, wherein the second underlayer has a thickness between 25–200 Å.

* * * * *